UNITED STATES PATENT OFFICE.

ALFRED KERN, OF BASLE, SWITZERLAND, ASSIGNOR TO THE BADISCHE ANILIN AND SODA FABRIK, OF MANNHEIM, GERMANY.

MANUFACTURE OF PURPLE DYE-STUFF.

SPECIFICATION forming part of Letters Patent No. 290,892, dated December 25, 1883.

Application filed September 21, 1883. (No specimens.)

*To all whom it may concern:*

Be it known that I, ALFRED KERN, a citizen of the Swiss Republic, residing at Basle, in Switzerland, have invented new and useful Improvements in the Manufacture of a Purple Dye-Stuff or Coloring-Matter, of which the following is a specification.

This invention relates to an improvement in the manufacture of a purple dye-stuff or coloring-matter, which I term "crystallized methyl-violet," described and claimed in a separate application for Letters Patent bearing date the 18th day of August, 1883, and which is produced from dimethyl-aniline, by converting the same into a derivative known in chemical literature by the name of "tetramethyl-diamido-benzophenone." (Beilstein's Hand-book of Organic Chemistry, edit. 1883, p. 1675,) treating the said derivative with reducing or hydrogenizing agents combining the hydrogenized product thus obtained with dimethyl-aniline, submitting the result of such combination to an oxidizing process and crystallizing the dye-stuff or coloring-matter thus produced from its solution in suitable solvents.

In carrying out my invention I take one hundred parts, by weight, of the above-mentioned tetramethyl-diamido-benzophenone and dissolve the same in about one thousand parts, by weight, of amylic alcohol, containing about sixty parts, by weight, of dry caustic soda in solution. I then heat the alkaline solution thus obtained with about eighty parts, by weight, of zinc-dust, at a temperature from 120° to 130° centigrade during about forty-eight hours, or until the reaction no longer appears to proceed. This point may be ascertained by withdrawing a sample of the said alkaline solution from time to time, and strongly acidifying the same by the addition of glacial acetic acid, whereby an intensely-blue color will be developed. I consider the hydrogenizing action to be finished if the said blue color of the sample no longer increases in intensity. I then allow the mixture to settle, and I draw off the clear solution into a still in order to distill off the amylic alcohol, which may thus be recovered. The residue which is left behind in the still is then freed from alkali by repeated washings with water, and afterward dissolved in an excess of cold and dilute hydrochloric acid—say in a mixture of about one hundred parts, by weight, of strong hydrochloric acid of 1.18 specific gravity with two hundred and fifty parts of water. The acid solution thus obtained is then filtered, and the filtered liquor is mixed with about fifteen hundred parts of water and fractionally precipitated by the addition of caustic-soda liquor, in order to separate the hydrogenized product from any tetramethyl-diamido-benzophenone which may have remained unacted upon by the hydrogenizing mixture of zinc-dust and alkali, as before described. For this purpose I add caustic-soda liquor until the solution has assumed a pure blue color, whereby a precipitate is formed containing the unaltered tetramethyl-diamido-benzophenone, if such be present. I then filter and precipitate the filtered solution by adding thereto caustic-soda liquor in slight excess. The hydrogenized product thus precipitated, and which in chemical language may be called "tetramethyl-diamido-benzhydrole," is filtered free from alkali by washings with water, pressed and dissolved in about one hundred and fifty parts, by weight, of diluted sulphuric acid, containing about thirty parts, by weight, of rectified sulphuric acid of 66° Baumé. I then add thirty parts, by weight, of dimethyl-aniline, and the reaction is allowed to proceed, first, at an ordinary temperature during about twelve hours, and afterward at about 100° centigrade during about three hours, or until the combination (or the so-called "condensation") of the hydrogenized product with dimethyl-aniline has been accomplished, which point may be ascertained by the entire change of the existing blue color of the last-named mixture into a pale greenish hue. This point being arrived at, I add caustic-soda liquor in sufficient excess to liberate the organic bases contained in the said mixture. I then distill off the dimethyl-aniline which has remained unacted upon, and I filter and wash the solid product thus obtained. The said product, which in chemical language may be called the "leuco base," of my new coloring-matter, is then submitted to an oxidizing process analogous to that which is now generally used for converting the leuco bases of malachite-green, or of similar dyestuffs into their corresponding coloring-matters. In the present instance I dissolve about twenty parts, by weight, of the said leuco base of my new coloring-matter in about twenty-five parts, by weight, of hydrochloric acid of 1.18 specific gravity and about nine hundred parts of water, and to the solution thus obtained I then add, in the cold and under constant agitation, about thirteen parts, by weight, of peroxide of lead in a state of fine division. The oxidation of the leuco base being accomplished, which is indicated by the purple color of the solution no longer increasing in intensity, I then add about twenty parts, by weight, of crystallized sulphate of soda, in order to free the solution from lead salts, and I precipitate the coloring-matter by the addition of common salt. The precipitate thus produced is collected on a filter and exhausted with boiling water. The coloring-matter passes into solution, and is again precipitated by the addition of salt and water in a crystalline form. It may be obtained in large crystals by recrystallization from water.

Crystallized methyl-violet, prepared as hereinbefore described, presents the following characteristics: It is the hydrochlorate of an organic base the chemical composition of which corresponds to that of a methyl derivative of para-rosaniline. The said base forms also a well crystallized sulphate and oxalate. The hydrochlorate presents the appearance of well-defined crystals, varying in size from small prismatic needles to large prisms, sometimes possessing a length of several centimeters and an according thickness. The crystals exhibit a metallic green or bronze-like luster. They contain water of crystallization, which they lose upon being dried in the water-bath. They dissolve in water with a bright bluish-purple color. Their concentrated aqueous solution upon being mixed with a concentrated aqueous solution of oxalic acid, separates the oxalate in the form of glistening metallic green crystals.

From the ordinary methyl violets or purples, which are mixtures of various coloring-matters, and are hitherto known in commerce only under the appearance of amorphous powders or lumps, my new crystallized methyl-violet principally differs by its crystallized condition and by its uniformity of composition, in consequence of which properties it is capable of producing more uniform and superior results in its application as a dye-stuff or coloring-matter than those up to the present known. Crystallized methyl-violet dyes upon textile fiber a bluish-purple shade similar in tint, but brighter than the shade produced by the benzylated derivative of ordinary methyl-violet known in commerce as "methyl-violet 5 B."

What I claim as new, and desire to secure by Letters Patent, is—

An improved process of manufacturing crystallized methyl-violet by treating tetramethyl-diamido-benzophenone with reducing or hydrogenizing agents, combining tetramethyl-diamido-benzhydrole, the hydrogenized product thus obtained, with dimethyl-aniline, submitting the result of such combination to an oxidizing process and crystallizing the dye-stuff or coloring-matter thus produced from its solution in suitable solvents, substantially in the manner hereinbefore described.

In testimony whereof I have hereunto set my hand and seal in the presence of two subscribing witnesses.

ALFRED KERN. [L. S.]

Witnesses:
N. HENZI,
F. FOFACKER.